United States Patent
Agrawal et al.

(10) Patent No.: US 9,444,587 B2
(45) Date of Patent: Sep. 13, 2016

(54) INCREMENTAL REDUNDANCY RELAYS FOR WIRELESS COMMUNICATION

(75) Inventors: Avneesh Agrawal, San Diego, CA (US); Alexei Y. Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 630 days.

(21) Appl. No.: 12/253,108

(22) Filed: Oct. 16, 2008

(65) Prior Publication Data

US 2010/0097976 A1 Apr. 22, 2010

(51) Int. Cl.
*H04L 1/18* (2006.01)
*H04L 1/00* (2006.01)

(52) U.S. Cl.
CPC ..... *H04L 1/1819* (2013.01); *H04L 2001/0097* (2013.01)

(58) Field of Classification Search
CPC .................................................. H04W 84/047
USPC ......................................... 370/315; 455/7–25
See application file for complete search history.

(56) References Cited

U.S. PATENT DOCUMENTS

| | | | |
|---|---|---|---|
| 5,416,805 A | 5/1995 | Tonello et al. | |
| 7,400,856 B2 * | 7/2008 | Sartori et al. | 455/7 |
| 7,813,695 B2 * | 10/2010 | Haartsen | 455/11.1 |
| 2001/0014087 A1 | 8/2001 | Sugaya et al. | |
| 2002/0054577 A1 * | 5/2002 | Gaskill et al. | 370/318 |
| 2003/0097629 A1 * | 5/2003 | Moon | H04L 1/0003 714/751 |
| 2004/0192204 A1 * | 9/2004 | Periyalwar et al. | 455/25 |
| 2007/0153716 A1 * | 7/2007 | Fukuzawa et al. | 370/315 |
| 2008/0056173 A1 * | 3/2008 | Watanabe | 370/315 |
| 2008/0108304 A1 | 5/2008 | Suga | |

(Continued)

FOREIGN PATENT DOCUMENTS

| | | |
|---|---|---|
| CN | 101137091 A | 3/2008 |
| EP | 1187386 A1 | 3/2002 |

(Continued)

OTHER PUBLICATIONS

Agustin, et al. :"Hybrid Turbo FEC/ARQ Systems and Distributed Space-Time Coding for Cooperative Transmission," Intl Journal of Wireless Information Networks, Kluwer Academic Publishers/Plenum Publishers, NE, vol. 12, No. 4 Dec. 1, 2005, pp. 263-280 ISSN: 1572-8129.

(Continued)

*Primary Examiner* — Hassan Kizou
*Assistant Examiner* — Ashil Farahmand

(57) ABSTRACT

Techniques for relaying transmissions in a wireless communication network are described. In one design, a relay may receive at least one assignment for a packet, which may be sent to the relay or intercepted by the relay. The relay may receive at least one transmission of a packet sent from a transmitter to a receiver. The relay may process the at least one transmission to decode the packet and may generate at least one additional transmission of the packet after correctly decoding the packet. The relay may send the at least one additional transmission of the packet to the receiver. The transmission(s) and the additional transmission(s) may be HARQ transmissions with different redundancy information for the packet. The transmitter may send transmissions until an acknowledgement (ACK) is received from the receiver or the relay. The relay may send additional transmissions until an ACK is received from the receiver.

25 Claims, 9 Drawing Sheets

(56) References Cited

U.S. PATENT DOCUMENTS

2009/0016256 A1\* 1/2009 Kim et al. .................. 370/315
2009/0061920 A1 3/2009 Horiuchi et al.

FOREIGN PATENT DOCUMENTS

| JP | 05090991 | 4/1993 |
| JP | H10322150 A | 12/1998 |
| JP | 2007019574 A | 1/2007 |
| JP | 2008118499 A | 5/2008 |
| WO | WO-0195579 A2 | 12/2001 |
| WO | 2006101013 A1 | 9/2006 |
| WO | 2007077476 A1 | 7/2007 |
| WO | WO2008024158 | 2/2008 |

OTHER PUBLICATIONS

Herhold., et al., "A simple cooperative extension to wireless relaying," Communications, 2004 International Zurich Seminar on Zurich, Switzerland Feb. 18-20, 2004, Piscataway, NJ, USA, IEEE, Feb. 18, 2004, pp. 36-39,XP010697662, ISBN: 978-0-7803-8329-6.
International Search Report and Written Opinion—PCT/US2008/088249—ISAEPO—Jul. 28, 2009.
Yu., et al., "Efficient ARQ protocols for exploiting cooperative relaying in wireless sensor networks," Computer Communications, Elsevier Science Publishers BV, Amsterdam, NL, vol. 30, No. 14-15, Sep. 25, 2007, pp. 2765-2773, XP022267719, ISSN: 0140-3664.
Taiwan Search Report—TW097151738—TIPO—Feb. 6, 2012.

\* cited by examiner

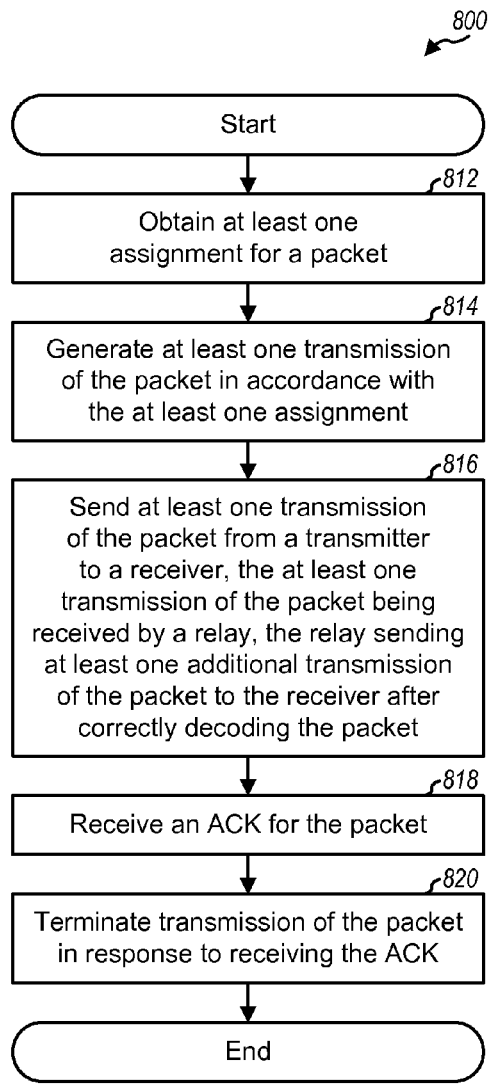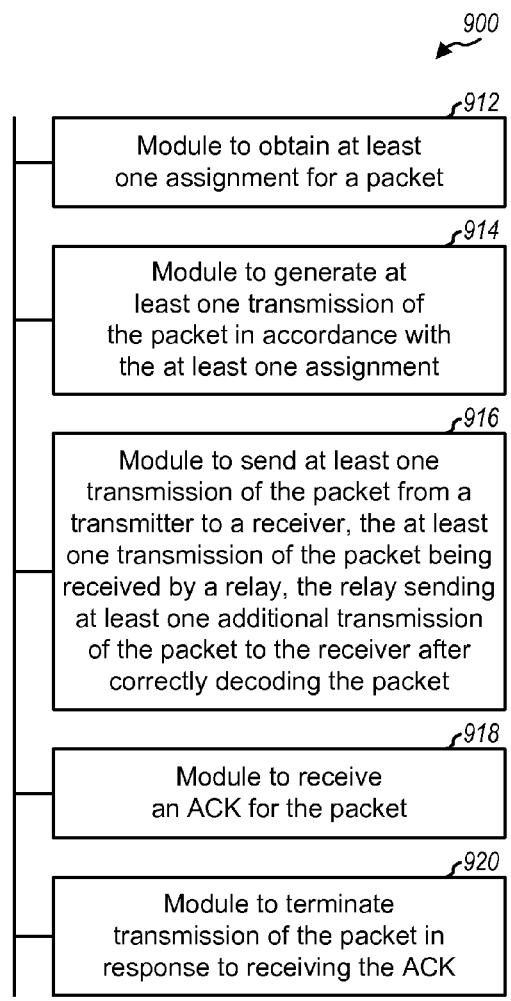
FIG. 8
FIG. 9

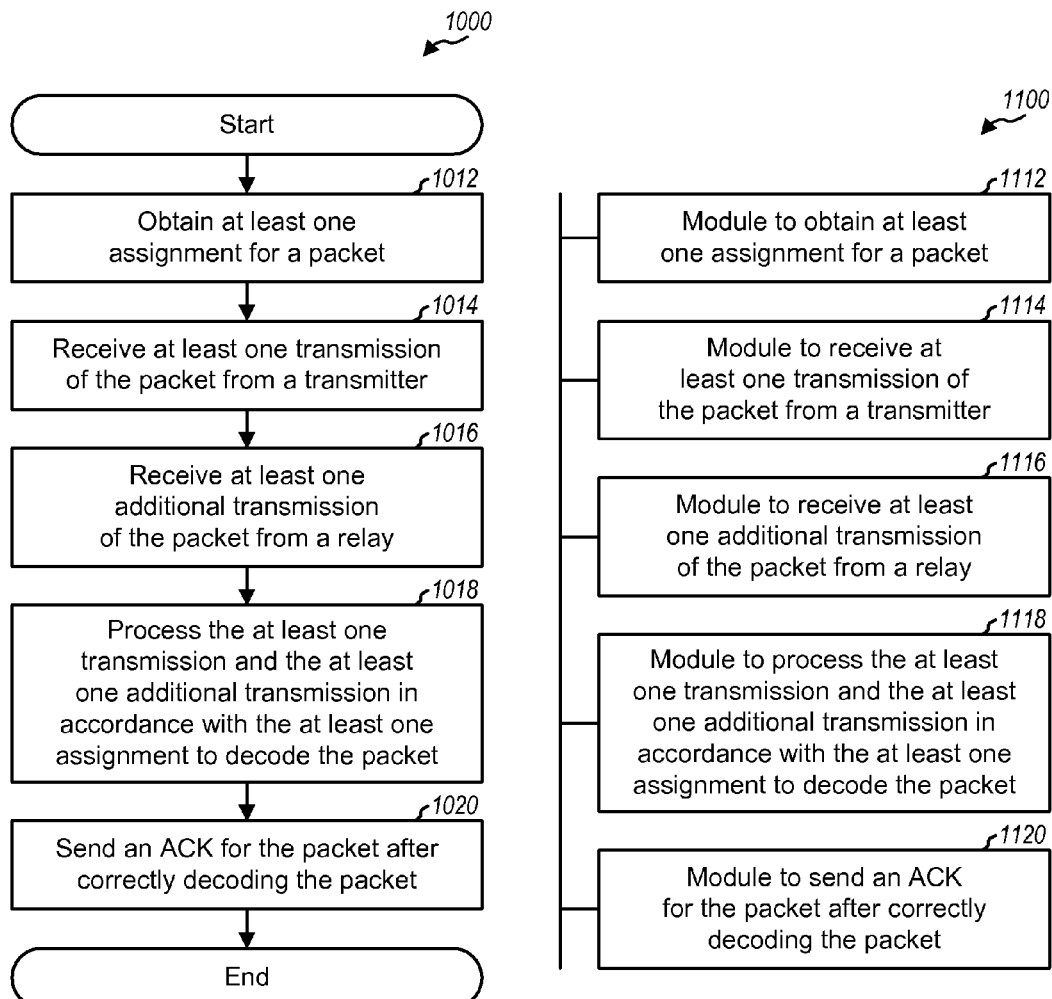

INCREMENTAL REDUNDANCY RELAYS FOR WIRELESS COMMUNICATION

BACKGROUND

I. Field

The present disclosure relates generally to communication, and more specifically to transmission techniques for wireless communication.

II. Background

Wireless communication networks are widely deployed to provide various communication services such as voice, video, packet data, messaging, broadcast, etc. These wireless networks may be capable of supporting communication for multiple users by sharing the available network resources. Examples of such wireless networks include wireless wide area networks (WWANs) providing communication coverage for large geographic areas, wireless metropolitan area networks (WMANs) providing communication coverage for medium geographic areas, and wireless local area networks (WLANs) providing communication coverage for small geographic areas.

It may be desirable to improve the coverage of a wireless network. This may be achieved by using radio frequency (RF) repeaters and/or mesh nodes. An RF repeater may receive an RF signal, amplify the received RF signal, and transmit the amplified RF signal. The RF repeater may amplify a desired signal as well as interference. Furthermore, noise from RF circuitry within the RF repeater may be injected in the amplified RF signal and may degrade the desired signal. RF repeaters may thus improve link budget but may cause a loss in network capacity. Mesh nodes are nodes that appear like base stations to terminals and like terminals to base stations. A mesh node may communicate with both a base station and a terminal in order to facilitate communication between the base station and the terminal. To obtain good performance for mesh nodes, extensive coordination between the mesh nodes and the wireless network may be required. This coordination may be difficult to achieve.

There is therefore a need in the art for more effective techniques to improve coverage for a wireless network.

SUMMARY

Techniques for relaying transmissions in a wireless communication network are described herein. In an aspect, a relay may relay transmissions by (i) receiving and processing at least one transmission of a packet from a transmitter to decode the packet and (ii) generating and sending at least one additional transmission of the packet to a receiver after correctly decoding the packet. The transmission(s) and the additional transmission(s) may be hybrid automatic repeat request (HARQ) transmissions comprising different redundancy information for the packet. The techniques may be used for data transmission on both the forward and reverse links. For the forward link, the transmitter may be a base station, and the receiver may be a terminal. For the reverse link, the transmitter may be a terminal, and the receiver may be a base station.

In one design, the relay may receive at least one assignment for a packet, which may be (i) sent from a base station to a terminal and intercepted by the relay or (ii) sent from the base station to the relay. The relay may receive at least one transmission of the packet sent from the transmitter to the receiver. The relay may process the at least one transmission to decode the packet and may generate at least one additional transmission of the packet after correctly decoding the packet. The relay may send the at least one additional transmission of the packet to the receiver.

In one design, the relay may determine assigned resources for the packet based on the at least one assignment. The relay may receive the at least one transmission from the transmitter on the assigned resources and may also send the at least one additional transmission to the receiver on the assigned resources. In one design, the relay may determine a packet format for the packet based on the at least one assignment. The relay may process the at least one transmission from the transmitter in accordance with the packet format to decode the packet and may also generate the at least one additional transmission in accordance with the packet format.

In one design, the relay may detect for an acknowledgement (ACK) from the receiver after each additional transmission of the packet. The relay may send another additional transmission of the packet if an ACK is not received and may terminate transmission of the packet if an ACK is received. In one design, the relay does not send ACK feedback to the transmitter, which may send transmissions of the packet until an ACK is received from the receiver. In another design, the relay may send an ACK to the transmitter after correctly decoding the packet. The transmitter may terminate transmission of the packet upon receiving the ACK from the relay and may start sending transmissions of another packet upon receiving an ACK from the receiver.

Various aspects and features of the disclosure are described in further detail below.

BRIEF DESCRIPTION OF THE DRAWINGS

FIG. 8 shows a process performed by a transmitter.

FIG. 9 shows an apparatus for sending transmissions of a packet.

FIG. 10 shows a process performed by a receiver.

FIG. 11 shows an apparatus for receiving transmissions of a packet.

DETAILED DESCRIPTION

The transmission techniques described herein may be used for various wireless communication networks such as WWANs, WMANs, WLANs, etc. The terms "network" and "system" are often used interchangeably. A WWAN may be a Code Division Multiple Access (CDMA) network, a Time Division Multiple Access (TDMA) network, a Frequency Division Multiple Access (FDMA) network, an Orthogonal FDMA (OFDMA) network, a Single-Carrier FDMA (SC-FDMA) network, etc. A CDMA network may implement a radio technology such as Universal Terrestrial Radio Access (UTRA), cdma2000, etc. A TDMA network may implement a radio technology such as Global System for Mobile Communications (GSM). An OFDMA network may implement a radio technology such as Evolved UTRA (E-UTRA), Ultra Mobile Broadband (UMB), Flash-OFDM®, etc. Long Term Evolution (LTE) is an upcoming release of "3rd Generation Partnership Project" (3GPP) that uses E-UTRA, which employs OFDMA on the downlink and SC-FDMA on the uplink. A WLAN may implement one or more standards in the IEEE 802.11 family of standards (which is also referred to as Wi-Fi), Hiperlan, etc. A WMAN may implement one or more standards in the IEEE 802.16 family of standards (which is also referred to as WiMAX). The transmission techniques described herein may be used for the radio technologies mentioned above as well as other radio technologies.

Figure 1:
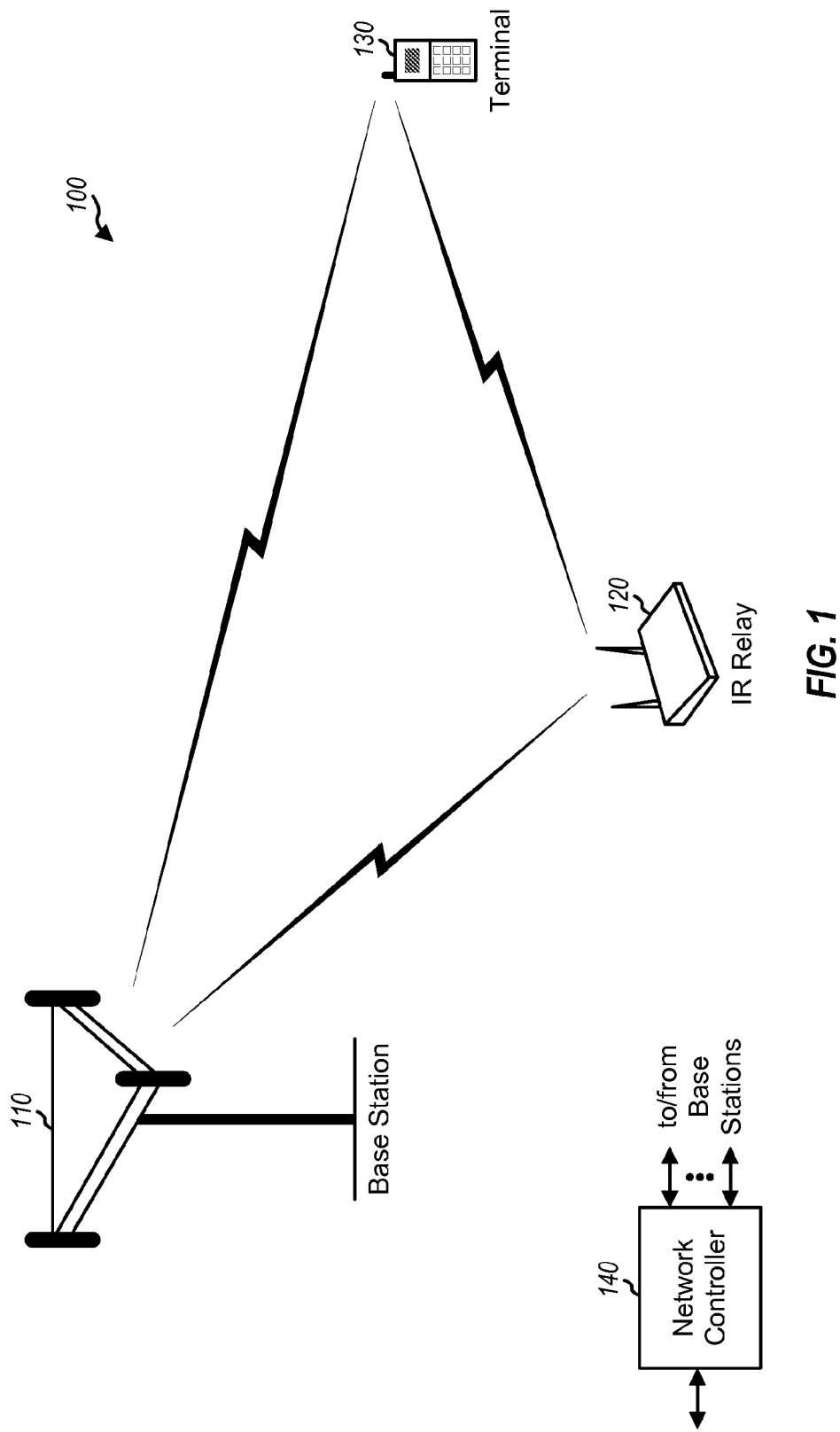
FIG. 1 shows a wireless communication network.

FIG. 1 shows a wireless communication network 100. For simplicity, only one base station 110, one incremental redundancy (IR) relay 120, one terminal 130, and one network controller 140 are shown in FIG. 1. In general, a wireless network may include any number of entities of each type.

Base station 110 may be a fixed station that communicates with the terminals and may also be referred to as a Node B, an evolved Node B (eNode B), an access point, etc. Base station 110 may provide communication coverage for a particular geographic area. To improve network capacity, the overall coverage area of base station 110 may be partitioned into multiple (e.g., three) smaller areas. Each smaller area may be served by a respective base station subsystem. The term "cell" can refer to the smallest coverage area of a base station and/or a base station subsystem serving this coverage area. Network controller 140 may couple to a set of base stations and provide coordination and control for the base stations. Network controller 140 may be a single network entity or a collection of network entities.

Terminal 130 may be located anywhere within the network and may be stationary or mobile. Terminal 130 may also be referred to as an access terminal, a mobile station, a user equipment, a subscriber station, a station, etc. Terminal 130 may be a cellular phone, a personal digital assistant (PDA), a wireless communication device, a handheld device, a wireless modem, a laptop computer, a cordless phone, a wireless local loop (WLL) station, etc. Terminal 130 may communicate with base station 110 on the forward and reverse links. The forward link (or downlink) refers to the communication link from base station 110 to terminal 130, and the reverse link (or uplink) refers to the communication link from terminal 130 to base station 110. Terminal 130 may also send transmissions to and/or receive transmissions from IR relay 120, with or without knowledge of terminal 130.

IR relay 120 may be a station that receives transmissions for specific terminals and send additional transmissions for these terminals. IR relay 120 may support data transmission on the forward and/or reverse link. On the forward link, IR relay 120 may receive a forward link signal from a base station (e.g., base station 110), process transmissions for a specific terminal (e.g., terminal 130) to decode a packet sent to the terminal, and transmit a forward link relay signal containing additional transmissions of the packet to the terminal. On the reverse link, IR relay 120 may receive reverse link signals from different terminals, process transmissions from a specific terminal (e.g., terminal 130) to decode a packet sent by the terminal, and transmit a reverse link relay signal containing additional transmissions of the packet to base station 110. In general, IR relay 120 may relay transmissions for only the forward link, or only the reverse link, or both the forward and reverse links. IR relay 120 may also relay transmissions for any number of terminals on each link.

The network may utilize HARQ, which may also be referred to as incremental redundancy. With HARQ, a transmitter may send one or more transmissions of a packet of data, one transmission at a time, until the packet is decoded correctly by a receiver, or the maximum number of transmissions has been sent, or some other termination condition is encountered. HARQ may improve reliability for data transmission and support rate adaptation for packets in the presence of changing channel conditions.

Figure 2:
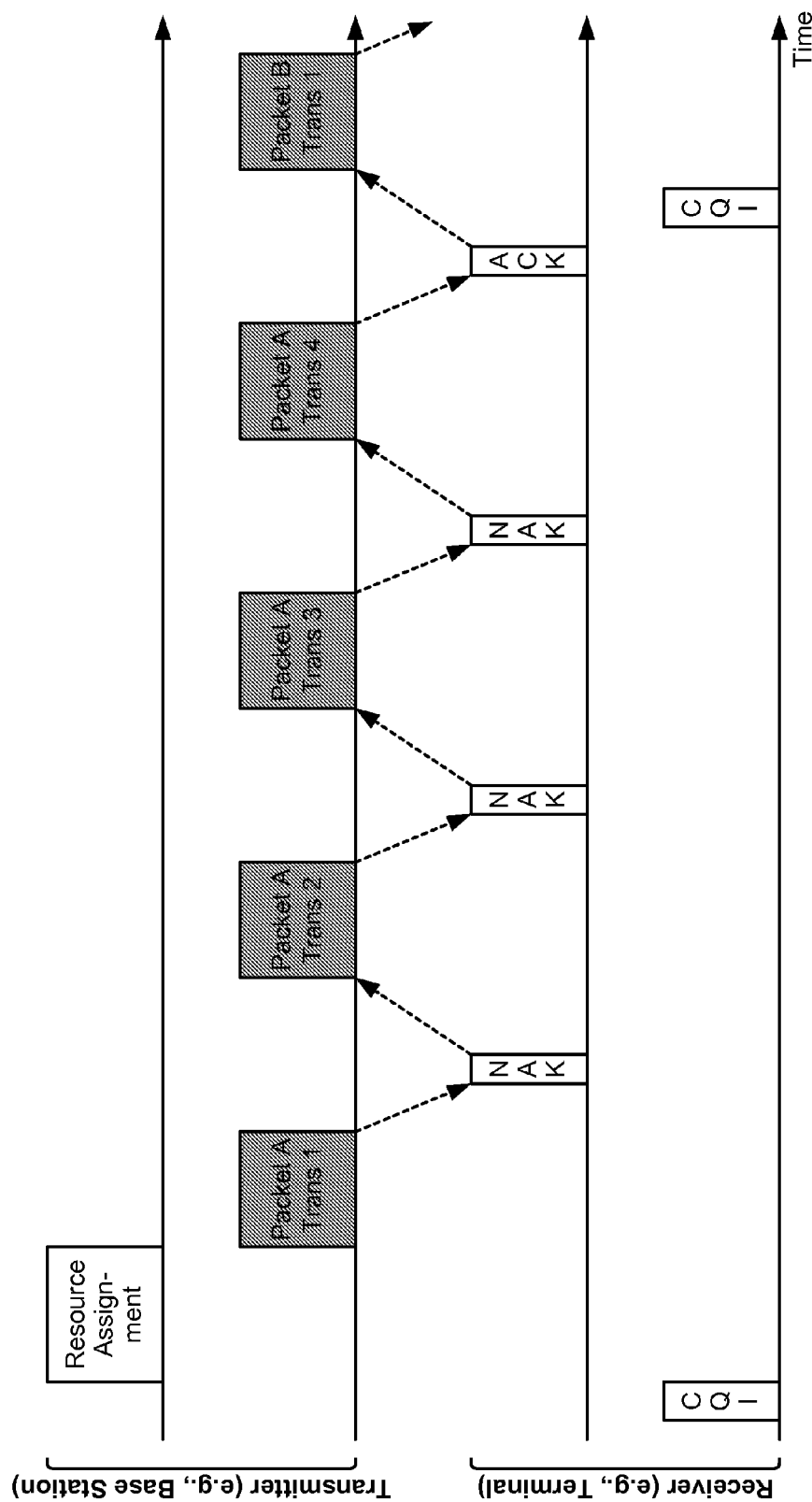
FIG. 2 shows a design of data transmission with HARQ.

FIG. 2 shows a design of data transmission with HARQ. For the forward link, base station 110 is a transmitter, and terminal 130 is a receiver. For the reverse link, terminal 130 is a transmitter, and base station 110 is a receiver. For clarity, much of the following description for FIG. 2 is for data transmission on the forward link.

Terminal 130 may periodically estimate the channel quality of the forward link from base station 110 to terminal 130 and may send channel quality indicator (CQI) information to base station 110. Base station 110 may use the CQI information to schedule terminal 130 for data transmission and to select a packet format for data transmission to terminal 130. A packet format may also be referred to as a transport format, a modulation and coding scheme (MCS), a rate, etc. The selected packet format may be associated with a specific modulation scheme, a specific code rate or coding scheme, a specific packet size, etc. The packet format may be selected such that terminal 130 can correctly decode a packet with high probability after N transmissions of the packet, where N is a target number of transmissions and may be referred to as a target termination. Each transmission of the packet may also be referred to as an HARQ transmission. The different transmissions of the packet may contain different redundancy information for the packet and may be used to decode the packet.

Base station 110 may send a resource assignment to terminal 130. In general, the assignment may include any information used to receive and decode a packet. The assignment may convey specific resources assigned for data transmission to terminal 130. The assigned resources may comprise one or more resource blocks or tiles, and each resource block may be a set of subcarriers in a specific time interval. The assignment may also convey the selected packet format. If the selected packet format is not sent, then terminal 130 may perform blind decoding and attempt to decode the packet with different possible packet formats. The assignment may be (i) non-persistent and valid for only one transmission of a packet or (ii) persistent and valid for all transmissions of a packet or a set of packets, or until the assignment is revoked. The assignment may be sent prior to transmissions of the packet (as shown in FIG. 2) or with the first transmission of the packet (not shown in FIG. 2). The assignment may be sent on a control channel carrying control information, a data channel carrying traffic data, etc.

Base station 110 may process (e.g., encode and modulate) a packet of data (Packet A) in accordance with the selected packet format and generate data symbols. Base station 110 may send a first transmission (Trans 1) of Packet A on the assigned resources to terminal 130. Terminal 130 may receive and process (e.g., demodulate and decode) the first transmission, determine that Packet A is decoded in error, and send a negative acknowledgement (NAK) to base station 110. Base station 110 may receive the NAK and send a second transmission (Trans 2) of Packet A. Terminal 130 may receive the second transmission, process the first and second transmissions to decode packet A, determine that Packet A is decoded in error, and send a NAK. Base station 110 may receive the NAK and send a third transmission (Trans 3) of Packet A. Terminal 130 may receive the third transmission, process the first through third transmissions to decode packet A, determine that Packet A is decoded in error, and send a NAK. Base station 110 may receive the NAK and send a fourth transmission (Trans 4) of Packet A. Terminal 130 may receive the fourth transmission, process the first through fourth transmissions to decode packet A, determine that Packet A is decoded correctly, and send an acknowledgement (ACK).

Base station 110 may receive the ACK and terminate transmission of Packet A. Base station 110 may then process the next packet (Packet B) and send transmissions of Packet B in similar manner. Although not shown in FIG. 2 for simplicity, another resource assignment may be sent for packet B and may include assigned resources and a selected packet format for packet B.

The transmission timeline may be partitioned into frames, and each frame may have a particular time duration. Multiple (Q) HARQ interlaces may be defined, with each HARQ interlace containing frames that are spaced apart by Q frames. The Q HARQ interlaces may be offset from one another by one frame. All transmissions of a given packet may be sent in different frames on one HARQ interlace. Up to Q packets may be sent in parallel in a time interlaced manner on the Q HARQ interlaces.

For clarity, FIG. 2 shows feedback of both NAKs and ACKs. For an ACK-based scheme, an ACK may be sent if a packet is decoded correctly, and NAKs are not sent and are presumed by the absence of ACKs. NAKs may be sent explicitly or implicitly.

FIG. 2 shows data transmission with HARQ on the forward link from base station 110 to terminal 130. Data transmission with HARQ on the reverse link may occur in similar manner. For the reverse link, base station 110 may estimate the channel quality of the reverse link and select a packet format based on the estimated channel quality. Base station 110 may then send a resource assignment conveying assigned resources, the selected packet format, etc. Terminal 130 may process a packet in accordance with the selected packet format and send transmissions of the packet on the assigned resources to base station 110.

IR relay 120 may be used to improve performance of data transmission on the forward and/or reverse link. IR relay 120 may achieve this improvement with or without coordination through base station 110. Terminal 130 may be affected by IR relay 120 but may or may not be aware of the presence of IR relay 120. IR relay 120 may operate in various manners, as described below.

Figure 3:
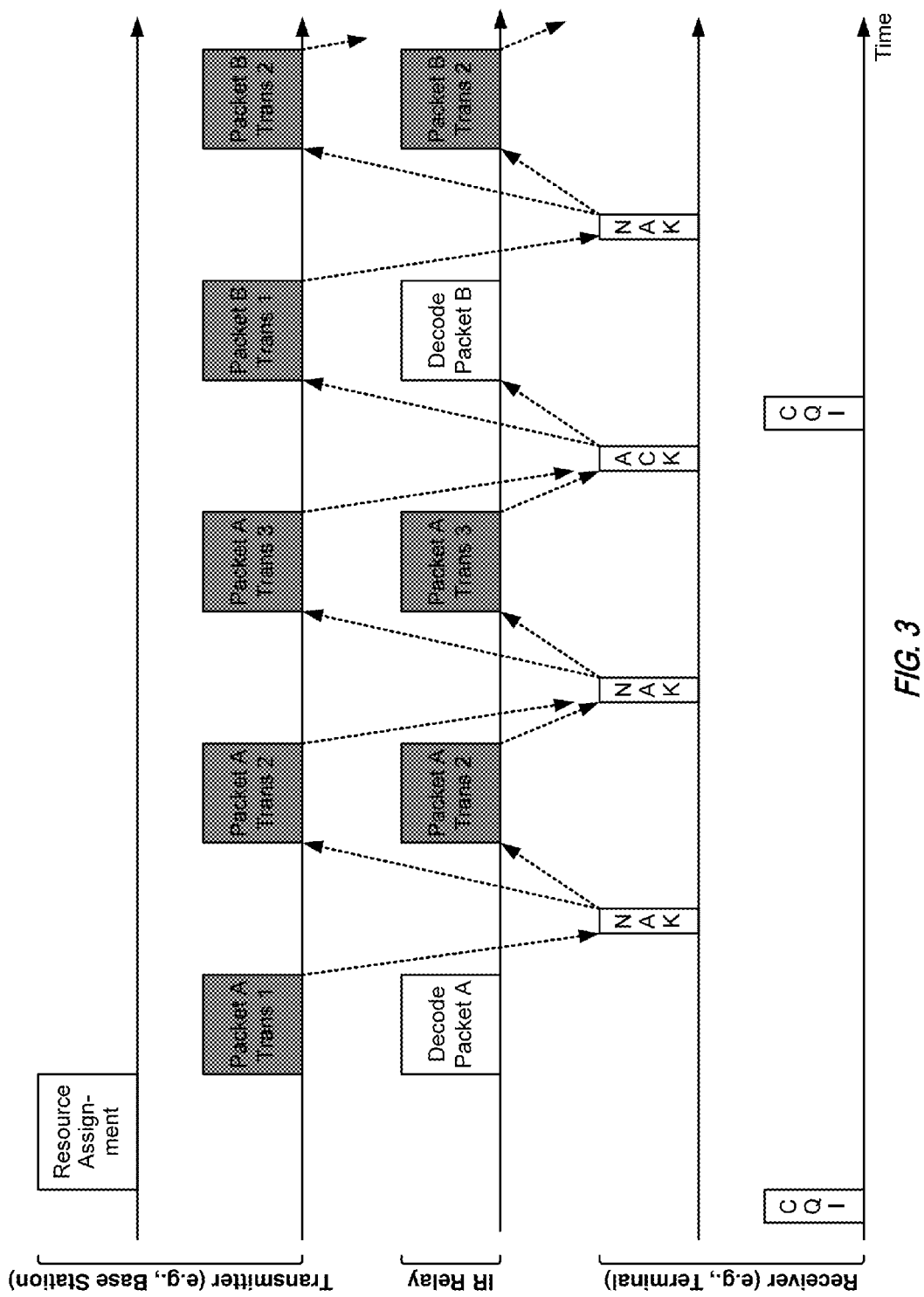
FIG. 3 shows a design of relaying transmissions with HARQ.

FIG. 3 shows a design of data transmission with HARQ from a transmitter to a receiver, with IR relay 120 relaying transmissions. For the forward link (as shown in FIG. 3), the transmitter may be base station 110, and the receiver may be terminal 130. Terminal 130 may estimate the forward link channel quality and send CQI information to base station 110. Base station 110 may select a packet format based on the CQI information and may send a resource assignment to terminal 130. For the reverse link (not shown in FIG. 3), the transmitter may be terminal 130, and the receiver may be base station 110. Base station 110 may estimate the reverse link channel quality, select a packet format based on the estimated channel quality, and send a resource assignment to terminal 130. The signaling between base station 110 and terminal 130 may be different for data transmission on the forward and reverse links. However, transmissions of packets and ACK/NAK feedback may be similar for the forward and reverse links.

For both the forward and reverse links, IR relay 120 may obtain the assignment for terminal 130 in various manners. In one design, IR relay 120 may monitor a control channel carrying assignments from base station 110 in the same manner as terminal 130. IR relay 120 may obtain the assignment for terminal 130 from the control channel. In another design, IR relay 120 may receive the assignment directly from base station 110.

For data transmission, the transmitter may process a packet in accordance with a selected packet format and may send the first transmission of Packet A on the assigned resources. IR relay 120 may receive the first transmission from the transmitter and may process the first transmission to decode Packet A. In the example shown in FIG. 3, IR relay 120 correctly decodes packet A based on the first transmission. The receiver may also receive the first transmission from the transmitter and may process the first transmission to decode packet A. The receiver may determine that Packet A is decoded in error and may send a NAK to the transmitter.

The transmitter may receive the NAK from the receiver and may send a second transmission of Packet A on the assigned resources. IR relay 120 may generate the second and subsequent transmissions of packet A in the same manner as the transmitter based on the decoded packet A. IR relay 120 may receive the NAK from the receiver and may send the second transmission of Packet A on the same resources used by the transmitter for the second transmission. The receiver may receive the second transmission from both the transmitter and IR relay 120. The receiver may process the first and second transmissions from the transmitter and the second transmission from IR relay 120 to decode packet A. The receiver may determine that Packet A is decoded in error and may send a NAK.

The transmitter and IR relay 120 may receive the NAK from the receiver and both may send a third transmission of Packet A on the assigned resources. The receiver may receive the third transmission from both the transmitter and IR relay 120. The receiver may process the first through third transmissions to decode Packet A, determine that Packet A is decoded correctly, and send an ACK. The transmitter and IR relay 120 may both receive the ACK from the receiver and may terminate transmission of Packet A. The transmitter may then process the next Packet B and send transmissions of Packet B in similar manner. IR relay 120 may process each transmission received from the transmitter to decode Packet B and may start sending transmissions of Packet B after correctly decoding the packet.

Figure 4:
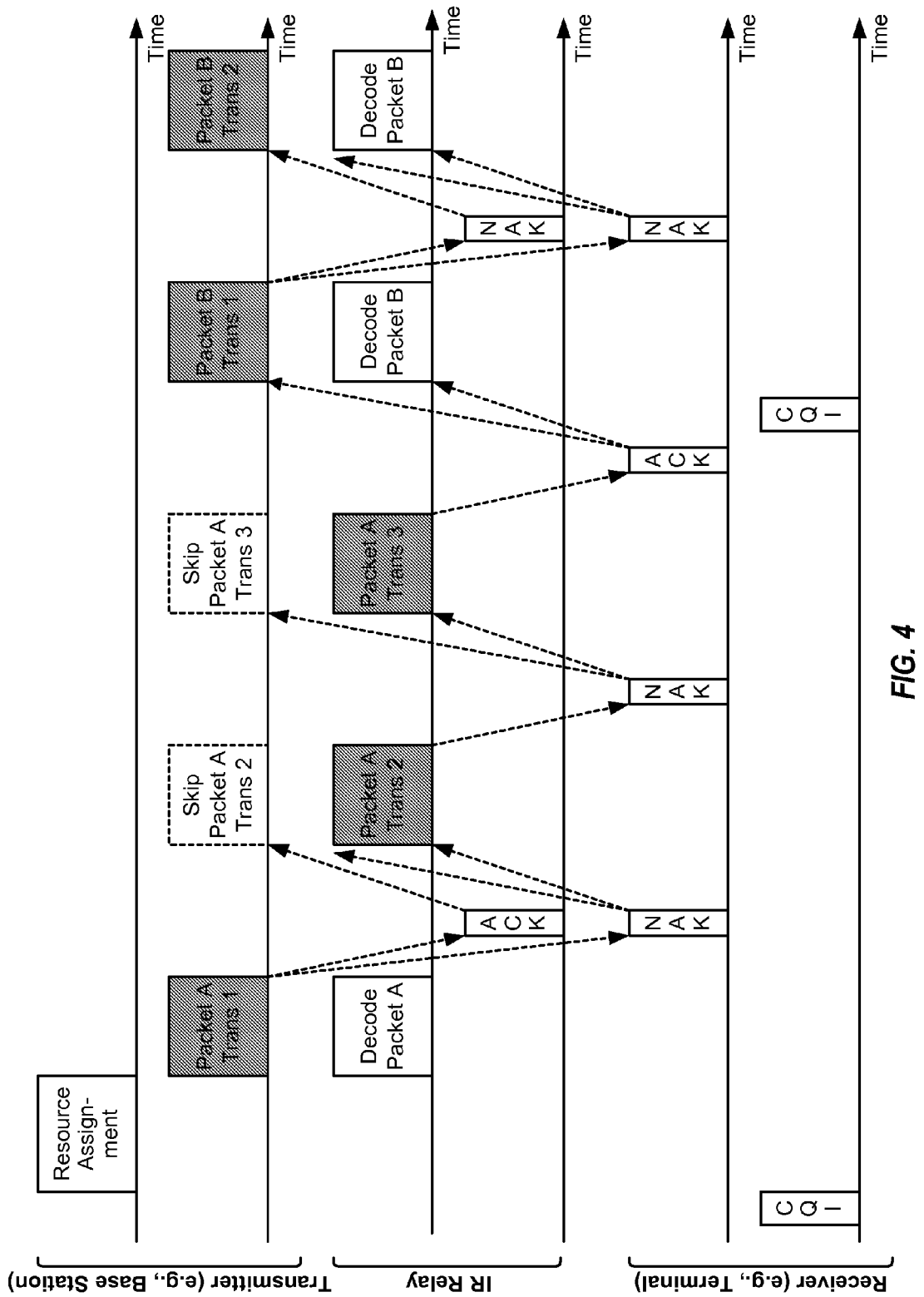
FIG. 4 shows another design of relaying transmissions with HARQ.

FIG. 4 shows another design of data transmission with HARQ from a transmitter to a receiver, with IR relay 120 relaying transmissions. For the forward link (as shown in FIG. 4), the transmitter may be base station 110, and the receiver may be terminal 130. For the reverse link (not shown in FIG. 3), the transmitter may be terminal 130, and the receiver may be base station 110. Base station 110 and terminal 130 may exchange signaling to initiate data transmission, and base station 110 may send a resource assignment to terminal 130. The assignment may convey the assigned resources, a selected packet format, etc. IR relay 120 may obtain the assignment as described above for FIG. 3.

For data transmission, the transmitter may process a packet in accordance with the selected packet format and may send the first transmission of Packet A on the assigned resources. IR relay 120 may receive the first transmission from the transmitter and may process the first transmission to decode Packet A. IR relay 120 may determine that packet A is decoded correctly and may send an ACK to the transmitter. The receiver may also receive the first transmission from the transmitter and may process the first transmission to decode packet A. The receiver may determine that Packet A is decoded in error and may send a NAK to the transmitter.

The transmitter may receive the ACK/NAK feedback from both IR relay 120 and the receiver. In one design, the transmitter may terminate transmission of a packet based on an ACK received from IR relay 120 and may start transmission of a new packet based on an ACK received from the receiver. In the example shown in FIG. 4, the transmitter may receive the ACK from IR relay 120 and may terminate transmission of Packet A. The transmitter may also receive the NAK from the receiver and may delay transmission of the next Packet B. IR relay 120 may also receive the NAK from the receiver and may recognize that the receiver did not correctly decode Packet A. IR relay 120 may process (e.g., encode and modulate) Packet A in accordance with the selected packet format and may send a second transmission of Packet A on the assigned resources in the same manner as the transmitter. The receiver may receive the second transmission from IR relay 120 and may not be aware of the change in transmitting entity. The receiver may process the first and second transmissions to decode packet A, determine that Packet A is decoded in error, and send a NAK. IR relay 120 may receive the NAK from the receiver and may send a third transmission of Packet A on the assigned resources. The receiver may receive the third transmission from IR relay 120, process the first through third transmissions to decode packet A, determine that Packet A is decoded correctly, and send an ACK.

The transmitter may receive the ACK from the receiver and may start transmission of the next Packet B. IR relay 120 may also receive the ACK from terminal 130 and may terminate transmission of Packet A. Packet B may be transmitted in similar manner as Packet A.

The designs in FIGS. 3 and 4 may be used for data transmission on both the forward and reverse links. For data transmission on a given link, IR relay 120 may obtain an assignment for a packet and may be able to receive transmissions of the packet sent by the transmitter to the receiver. IR relay 120 may attempt to decode the packet after each transmission of the packet, in the same manner as the receiver. The link from the transmitter to IR relay 120 may be better than the link from the transmitter to the receiver. IR relay 120 may thus be able to successfully decode the packet with fewer transmissions than the receiver. After successfully decoding the packet, IR relay 120 may generate subsequent transmissions of the packet based on the decoded packet and in the same manner as the transmitter. IR relay 120 may send each subsequent transmission, as needed, on the same resources as the transmitter until the packet is decoded correctly by the receiver.

The designs in FIGS. 3 and 4 may be used for both synchronous and asynchronous HARQ. For synchronous HARQ, the assigned resources and the packet format for all transmissions of a packet may be provided by the initial assignment, e.g., as shown in FIGS. 3 and 4. For asynchronous HARQ, each transmission of a packet may be scheduled independently. For asynchronous HARQ in FIG. 3, the transmitter may send transmissions of a packet until an ACK is received from the receiver and may send assignments for all transmissions of the packet. IR relay 120 may intercept the assignments from the transmitter and may send subsequent transmissions in accordance with the assignments.

For asynchronous HARQ in FIG. 4, the transmitter may send transmissions of a packet until an ACK is received from IR relay 120 and may send assignments for all transmissions sent by the transmitter. Assignments for subsequent transmissions by IR relay 120 may be sent in various manners. In one design, the transmitter may continue to generate and send assignments even after it stops transmitting the packet. The transmitter may generate assignments for subsequent transmissions by IR relay 120 as if the transmitter was still transmitting. In another design, the transmitter may stop sending assignments when it stops transmitting. IR relay 120 may generate and send assignments for subsequent transmissions to the receiver. IR relay 120 may use the assigned resources and the packet format in the initial assignment from the transmitter. In yet another design, when the transmitter stops transmitting, IR relay 120 may assign resources, select a packet format, and generate assignments for subsequent transmissions in the same manner as the transmitter. IR relay 120 may be pre-allocated a pool of resources for subsequent transmissions (e.g., by a base station) and may assign resources from this pool. Assignments for transmissions may also be generated and sent in other manners for asynchronous HARQ.

For both synchronous and asynchronous HARQ, the receiver may receive transmissions from the transmitter and possibly IR relay 120. The receiver may not need to know where the transmissions are coming from and may not need to know the presence of IR relay 120. The transmitter may also not need to know whether IR relay 120 is present and sending transmissions of packets.

The receiver may send an ACK or a NAK for each transmission of a packet. If ACK/NAK feedback from IR relay 120 to the transmitter is supported, as shown in FIG. 4, then the transmitter may terminate transmission of the packet upon receiving an ACK from IR relay 120, which may reduce interference and improve overall network performance. If ACK/NAK feedback from IR relay 120 to the transmitter is not supported, as shown in FIG. 3, then the transmitter and IR relay 120 may both send transmissions of the packet until an ACK is received from the receiver.

In another design that is not shown in FIG. 3 or 4, IR relay 120 may (i) act as an RF repeater and transmit a repeated signal until a packet is decoded correctly and (ii) act as a relay and transmit a relay signal after the packet is decoded correctly. Before correctly decoding the packet, IR relay 120 may receive a transmitter signal from the transmitter, recondition (e.g., amplify and filter) the received signal to generate the repeated signal, and transmit the repeated signal to the receiver. After successfully decoding the packet, IR relay 120 may generate subsequent transmissions of the packet based on the decoded packet, generate the relay signal with these transmissions of the packet, and transmit the relay signal to the receiver. This design may improve performance for earlier transmissions of the packet.

Regardless of whether or not IR relay 120 transmits a repeated signal, improved performance may be achieved due to a higher quality relay signal generated by IR relay 120. IR relay 120 may be located relatively close to the transmitter and may be able to receive the transmissions from the transmitter with good quality. IR relay 120 may be able to correctly decode a packet from the transmitter after one or few transmissions of the packet. IR relay 120 may be able to generate subsequent transmissions based on the decoded packet. The relay link from IR relay 120 to the receiver may be better than the direct link from the transmitter to the receiver. The receiver may be able to receive the transmissions from IR relay 120 with better quality than the transmissions from the transmitter. Hence, the receiver may be able to correctly decode a packet sent by the transmitter with fewer transmissions due to assistance from IR relay 120.

In one design, a relay signal from IR relay 120 and a transmitter signal from the transmitter may have the same waveform for a packet being transmitted. The transmitter and IR relay 120 may appear as two stations in a single frequency network (SFN) to the receiver. For this design, the receiver may process a received signal comprising both the transmitter signal and the relay signal. The receiver may not need to distinguish between the two signals and may not need to be aware of the presence of IR relay 120. In another design, the relay signal may be distinguishable from the transmitter signal. In this design, the receiver may receive the transmitter signal and the relay signal and may process both signals or only the stronger signal.

In one design, a transmission of a packet from the transmitter may comprise data symbols on resources used for data (or data resources) as well as pilot symbols on resources used for pilot (or pilot resources). Pilot is data that is known a priori by the transmitter and the receiver and may also be referred to as reference, training, preamble, etc. A transmission of the packet from IR relay 120 may also comprise data symbols on the data resources and pilot symbols on the pilot resources. Sending pilot symbols from both the transmitter and IR relay 120 on the same resources may allow the receiver to derive a channel estimate for the links for both the transmitter and IR relay 120. The receiver may demodulate the received data symbols based on the channel estimate, without having to know the individual channel responses for the transmitter and IR relay 120.

In one design, IR relay 120 may send transmissions of a packet such that the transmissions from the transmitter and the transmissions from IR relay 120 are approximately time aligned at the receiver. This may reduce frequency selectivity of the received signal at the receiver and may improve performance.

Figure 5:
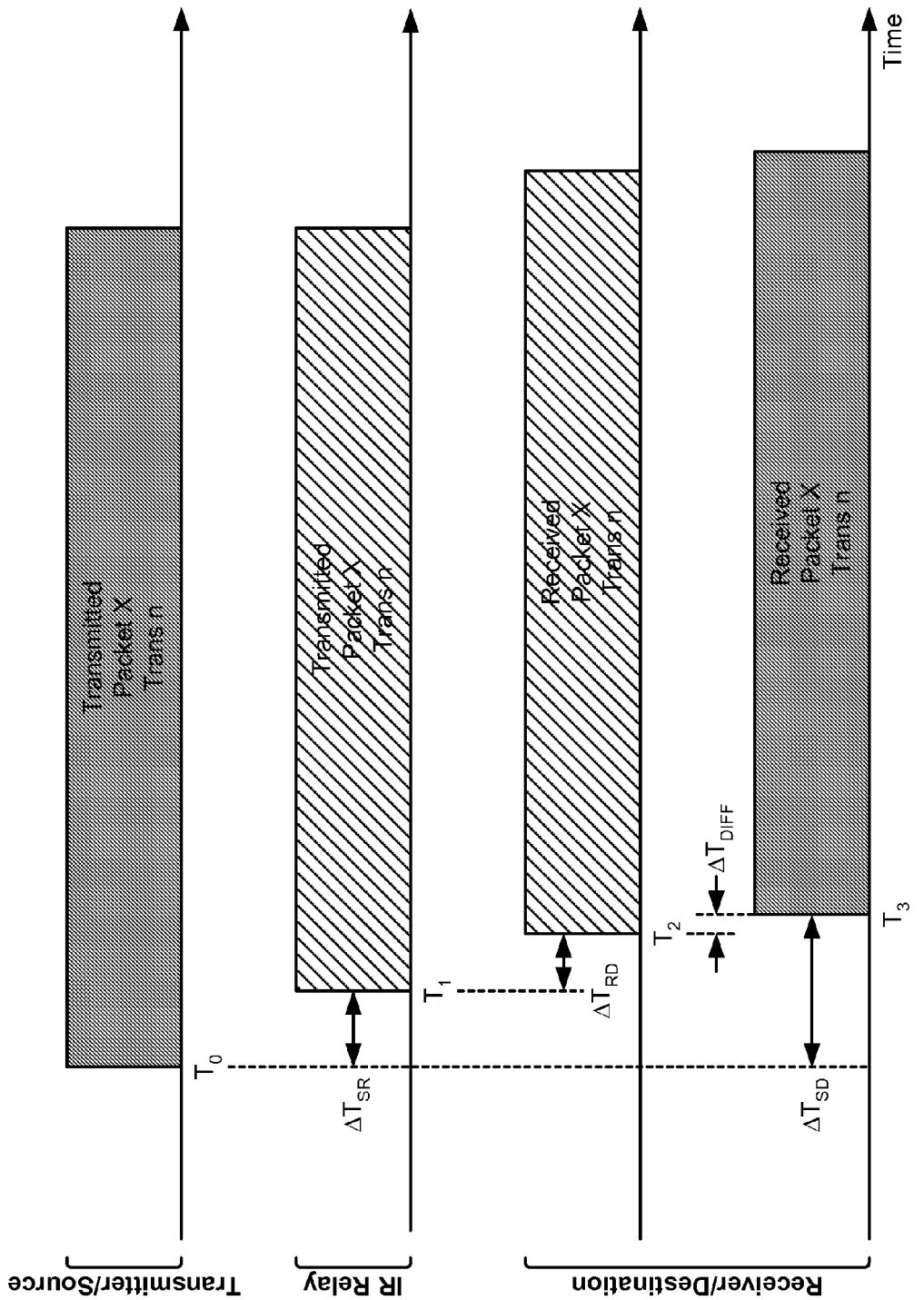
FIG. 5 shows transmissions of a packet from a transmitter and a relay.

FIG. 5 shows a design for sending transmissions of a packet from the transmitter and IR relay 120. The transmitter may send a transmission of the packet starting at time $T_0$. IR relay 120 may send a transmission of the packet starting at time $T_1$, which may be $\Delta T_{SR}$ from $T_0$. The receiver may receive the transmission of the packet from IR relay 120 starting at time $T_2$, which may be $\Delta T_{RD}$ from $T_1$. The receiver may also receive the transmission of the packet from the transmitter starting at time $T_3$, which may be $\Delta T_{SD}$ from $T_0$. $\Delta T_{SR}$ may be the propagation delay from the transmitter (or source "S") to IR relay 120 (or relay "R"). $\Delta T_{RD}$ may be the propagation delay from IR relay 120 to the receiver (or destination "D"). $\Delta T_{SD}$ may be the propagation delay from the transmitter to the receiver.

It may be desirable for the transmissions from the transmitter and the transmissions from IR relay 120 to arrive at or near the same time at the receiver. In one design, the receiver may determine a receive timing difference $\Delta T_{DIFF}$, which is the difference between $T_2$ and $T_3$, and may provide the receive timing difference to IR relay 120. IR relay 120 may adjust its transmit timing such that the receive timing difference at the receiver is close to zero.

In another design, IR relay 120 may autonomously adjust its transmit timing to reduce the receive timing difference at the receiver. IR relay 120 may determine $\Delta T_{SR}$ and may assume that $\Delta T_{SD}$ is approximately equal to $\Delta T_{SR}$. IR relay 120 may then set its transmit timing to be $\Delta T_{SR}$ from the transmit timing of the transmitter, i.e., make its transmit timing equal to its receive timing. Alternatively, IR relay 120 may set its transmit timing to be $\Delta T_{SR}-x$ from the transmit timing of the transmitter, where x may be a suitable offset value. The offset x may be selected to reduce the receive timing difference at the receiver.

IR relay 120 may relay traffic data for specific terminals on the forward and/or reverse link, as described above. IR relay 120 may also relay ACK/NAK feedback. On the forward link, IR relay 120 may serve as a proxy for terminal 130 and may acknowledge the transmissions sent by base station 110. For example, IR relay 120 may receive an ACK or NAK from terminal 130 for a transmission and may send the ACK or NAK to base station 110. On the reverse link, IR relay 120 may serve as a proxy for base station 110 and may acknowledge the transmissions sent by terminal 130. For example, IR relay 120 may receive an ACK or NAK from base station 110 for a transmission and may send the ACK or NAK to terminal 130.

In one design, IR relay 120 may adjust its transmit power level such that the received power of the transmissions from IR relay 120 is within a predetermined range (e.g., within several dBs) of the received power of transmissions from the transmitter at the receiver. IR relay 120 may be located closer to the receiver than the transmitter and may be able to send its transmissions at lower transmit power to achieve similar received power at the receiver. This may result in less interference in the network. In another design, IR relay 120 may send its transmissions at higher transmit power to provide a higher signal-to-noise-and-interference ratio (SINR) for the transmissions at the receiver. The higher SINR may result in faster packet termination.

In one design, the receiver may send power control commands indicating whether its received power is above or below a target level. The transmitter and IR relay 120 may adjust their transmit power levels based on the power control commands. In another design, the transmitter may control the transmit power of IR relay 120.

IR relay 120 may adjust its transmit power based on CQI information from the receiver. In one design, the transmitter may send a pilot used by the receiver for CQI measurement, which may be referred to as a CQI measurement pilot. IR relay 120 may superpose its CQI measurement pilot on top of the transmitter's CQI measurement pilot. The receiver may generate a single CQI report based on the superimposed pilots from the transmitter and IR relay 120. In another design, the receiver may be explicitly associated with IR relay 120, the transmitter and IR relay 120 may send separate pilots, and the receiver may send separate CQI reports to the transmitter and IR relay 120. For both designs, IR relay 120 may adjust its transmit power based on the CQI report received from the receiver, e.g., to achieve a target CQI.

In one design, terminal 130 may be power controlled by base station 110 and not IR relay 120. This design may ensure that terminal 130 can reliably send signaling (e.g., ACK/NAK feedback) to base station 110. In one design, the transmit power used by base station 110 for data sent to terminal 130 may be power controlled by terminal 130.

In the absence of proper association between IR relays and terminals, the use of IR relays may degrade network capacity due to extra interference generated by the relay signals. It may be desirable to enable association between IR relays and terminals based on (i) channel quality between the base stations and the terminals, (ii) channel quality between the base stations and the IR relays, and (iii) channel quality between the IR relays and the terminals. The channel quality between the base stations and the terminals may be estimated by the terminals based on pilots received from the base stations and may be reported by the terminals. The channel quality between the IR relays and the terminals may be estimated by the IR relays and/or the terminals.

In one design, terminal 130 may estimate the channel quality between terminal 130 and IR relays that are within range. An active set may be maintained for terminal 130 and may include one or more base stations designated to serve terminal 130. Terminal 130 may perform active set management and/or handoff procedures for the base stations in the network. Terminal 130 may extend these procedures to cover IR relays. Terminal 130 may detect the presence of IR relays and may perform operations such as acquisition, pilot measurements, pilot reporting, etc., for the IR relays. An IR relay may be added to the active set of terminal 130 in similar manner as a base station.

In one design, IR relay 120 may make measurements for pilots received from terminals and may report the pilot measurements to a designated base station, e.g., base station 110. The reported pilot measurements may be used to determine which terminals should be associated with IR relay 120. The association may be determined based further on (i) CQI information reported by the terminals for the link from base station 110 to the terminals and (ii) the channel quality between base station 110 and IR relay 120.

In general, a terminal may be associated with an appropriate IR relay based on (i) the channel quality between the terminal and a base station, (ii) the channel quality between the base station and the IR relay, and (iii) the channel quality between the IR relay and the terminal. The channel qualities may be estimated by one or more entities and may be reported to a designated entity. The designated entity may establish an association between the terminal and the IR relay and may send an indication of the association to all affected entities.

The IR relays described herein may provide improved performance over RF repeaters and mesh nodes. RF repeaters may amplify desired signals as well as interference and may also inject additional noise. Mesh nodes may require extensive coordination with the wireless network to achieve good performance, and the coordination may be difficult to achieve. The IR relays may provide the benefits of RF repeaters and mesh nodes and may improve signal quality for the terminals being relayed without introducing excessive interference.

Figures 6, 7:
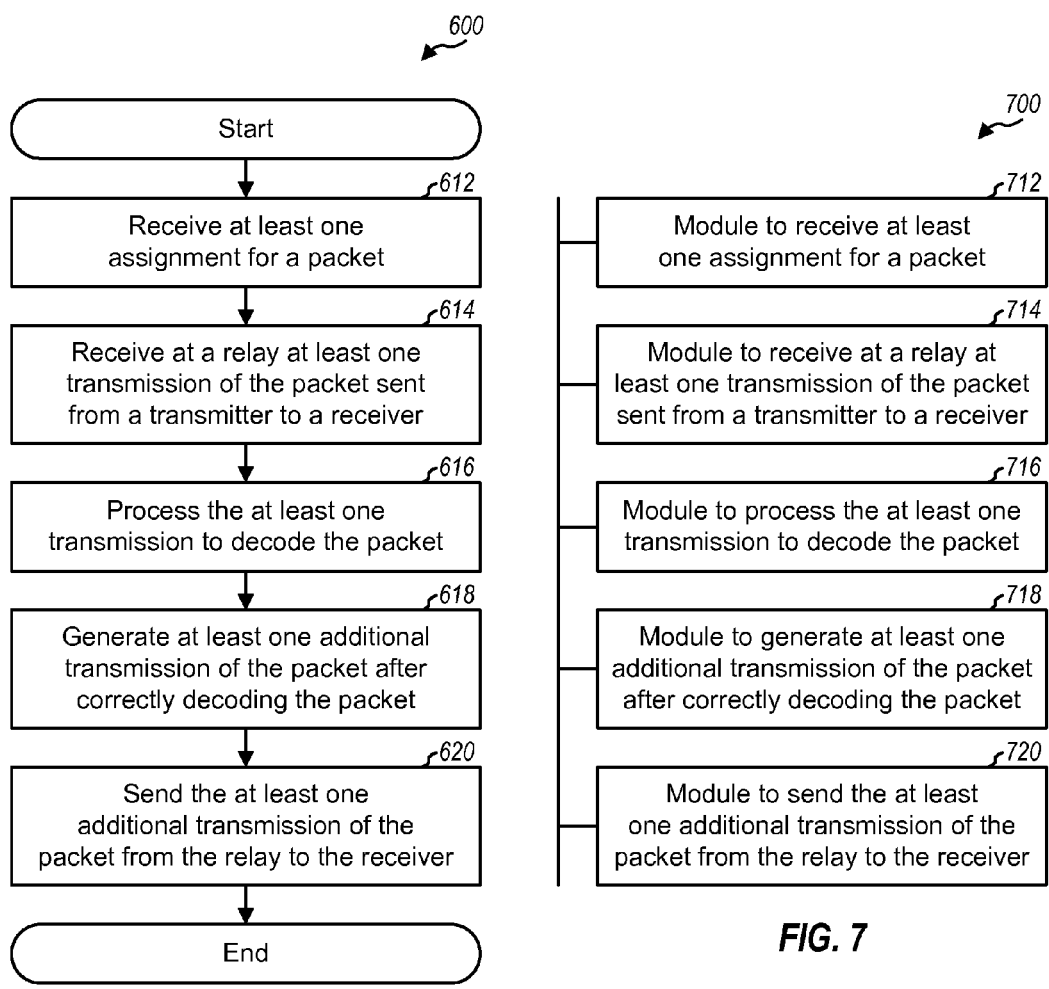
FIG. 6 shows a process performed by a relay.
FIG. 7 shows an apparatus for relaying transmissions of a packet.

FIG. 6 shows a design of a process 600 performed by a relay. The relay may receive at least one assignment for a packet (block 612). The at least one assignment may be (i) sent from a base station to a terminal and intercepted by the relay or (ii) sent from the base station to the relay. The relay may receive at least one transmission of the packet sent from a transmitter to a receiver (block 614). For data transmission on the forward link, the transmitter may be a base station, the receiver may be a terminal, and the at least one transmission may be sent from the base station to the terminal. For data transmission on the reverse link, the transmitter may be a terminal, the receiver may be a base station, and the at least one transmission may be sent from the terminal to the base station.

The relay may process the at least one transmission to decode the packet (block 616). The relay may generate at least one additional transmission of the packet after correctly decoding the packet (block 618). The relay may send the at least one additional transmission of the packet to the receiver (block 620).

In one design, the relay may determine assigned resources for the packet based on the at least one assignment. The relay may receive the at least one transmission from the transmitter on the assigned resources and may also send the at least one additional transmission to the receiver on the assigned resources. In one design, the relay may determine a packet format for the packet based on the at least one assignment. The relay may process the at least one transmission from the transmitter in accordance with the packet format and may also generate the at least one additional transmission in accordance with the packet format. The transmission(s) and the additional transmission(s) may be HARQ transmissions comprising different redundancy information for the packet.

In one design, the relay may detect for an ACK from the receiver after each additional transmission of the packet. The relay may send another additional transmission of the packet if an ACK is not received and may terminate transmission of the packet if an ACK is received. In one design, the relay does not send ACK/NAK feedback for the packet, e.g., as shown in FIG. 3. In another design, the relay may determine whether the packet is decoded correctly after each transmission of the packet from the transmitter and may send an ACK to the transmitter if the packet is decoded correctly, e.g., as shown in FIG. 4.

In one design, the at least one transmission and the at least one additional transmission of the packet may be for synchronous HARQ. The relay may obtain a single assignment applicable for all transmissions of the packet from the base station. The relay may generate and send the at least one additional transmission in accordance with the assignment.

In another design, the at least one transmission and the at least one additional transmission may be for asynchronous HARQ. In one design, the relay may obtain an assignment for each transmission and each additional transmission from the base station. In another design, the relay may obtain an assignment for each transmission from the base station and may generate and send an assignment for each additional transmission, e.g., using the resources (i) obtained from an assignment received from the base station or (ii) selected by the relay. For both designs, the relay may receive and process each transmission from the transmitter in accordance with the assignment obtained for that transmission. The relay may also generate and send each additional transmission to the receiver in accordance with the assignment for that additional transmission.

In one design, a transmit power level for the relay may be determined such that the received power of additional transmissions from the relay is (i) within a predetermined range of the received power of transmissions from the transmitter at the receiver or (ii) within a predetermined absolute range. The transmit power level for the relay may also be determined in other manners. The relay may send the at least one additional transmission at the determined transmit power level to the receiver. In one design, the transmit timing of the relay may be adjusted such that additional transmissions from the relay are received within a predetermined time window of transmissions from the transmitter at the receiver. The relay may send the at least one additional transmission in accordance with its transmit timing.

In one design, the relay may send no transmissions of the packet to the receiver if the packet has not been decoded correctly, e.g., as shown in FIGS. 3 and 4. In another design, the relay may recondition a signal received from the transmitter and may transmit the reconditioned signal to the receiver until the packet is decoded correctly.

In one design, the relay may receive an indication of association with the terminal. The relay may then relay transmissions of packets for the terminal (e.g., as shown in FIG. 3 or 4) in response to receiving the indication of association with the terminal.

FIG. 7 shows a design of an apparatus 700 for relaying transmissions. Apparatus 700 includes a module 712 to receive at least one assignment for a packet, a module 714 to receive at a relay at least one transmission of the packet sent from a transmitter to a receiver, a module 716 to process the at least one transmission to decode the packet, a module 718 to generate at least one additional transmission of the packet after correctly decoding the packet, and a module 720 to send the at least one additional transmission of the packet from the relay to the receiver.

FIG. 8 shows a design of a process 800 performed by a transmitter, which may be a base station for data transmission on the forward link or a terminal for data transmission on the reverse link. The transmitter may obtain at least one assignment for a packet, which may comprise assigned resources and a packet format for the packet (block 812). The at least one assignment may be (i) sent from the transmitter to the receiver or (ii) received by the transmitter from the receiver. The transmitter may generate at least one transmission of the packet in accordance with the at least one assignment (block 814).

The transmitter may send the at least one transmission of the packet to a receiver, with the at least one transmission being received by a relay (block 816). The relay may send at least one additional transmission of the packet to the receiver after correctly decoding the packet. The transmitter may receive an ACK for the packet (block 818) and may terminate transmission of the packet in response to receiving the ACK (block 820). In one design, the transmitter may receive the ACK from the receiver, e.g., as shown in FIG. 3. In another design, the transmitter may receive the ACK from the relay, e.g., as shown in FIG. 4. In this design, the transmitter may receive a second ACK for the packet from the receiver and may send transmissions of another packet after receiving the second ACK.

The transmitter may adjust transmit power of the receiver to obtain a target received signal quality for the receiver at the transmitter. This may ensure that the transmitter can reliably receive ACK/NAK feedback from the receiver.

FIG. 9 shows a design of an apparatus 900 for sending transmissions. Apparatus 900 includes a module 912 to obtain at least one assignment for a packet, a module 914 to generate at least one transmission of the packet in accordance with the at least one assignment, a module 916 to send at least one transmission of the packet from a transmitter to a receiver, the at least one transmission of the packet being received by a relay, the relay sending at least one additional transmission of the packet to the receiver after correctly decoding the packet, a module 918 to receive an ACK for the packet, and a module 920 to terminate transmission of the packet in response to receiving the ACK.

FIG. 10 shows a design of a process 1000 performed by a receiver, which may be terminal 130 for data transmission on the forward link or base station 110 for data transmission on the reverse link. The receiver may obtain at least one assignment for a packet (block 1012). The at least one assignment may be (i) received by the receiver from a transmitter or (ii) sent from the receiver to the transmitter. The receiver may receive at least one transmission of the packet from the transmitter (block 1014). The receiver may also receive at least one additional transmission of the packet from a relay (block 1016). The at least one assignment may comprise assigned resources, and the receiver may receive the at least one transmission and the at least one additional transmission on the assigned resources. The receiver may process the at least one transmission and the at least one additional transmission in accordance with the at least one assignment (e.g., a packet format) to decode the packet (block 1018). The receiver may send an ACK for the packet after correctly decoding the packet (block 1020).

FIG. 11 shows a design of an apparatus 1100 for receiving transmissions. Apparatus 1100 includes a module 1112 to obtain at least one assignment for a packet, a module 1114 to receive at least one transmission of the packet from a transmitter, a module 1116 to receive at least one additional transmission of the packet from a relay, a module 1118 to process the at least one transmission and the at least one additional transmission in accordance with the at least one assignment to decode the packet, and a module 1120 to send an ACK for the packet after correctly decoding the packet.

The modules in FIGS. 7, 9 and 11 may comprise processors, electronics devices, hardware devices, electronics components, logical circuits, memories, etc., or any combination thereof.

Figure 12:
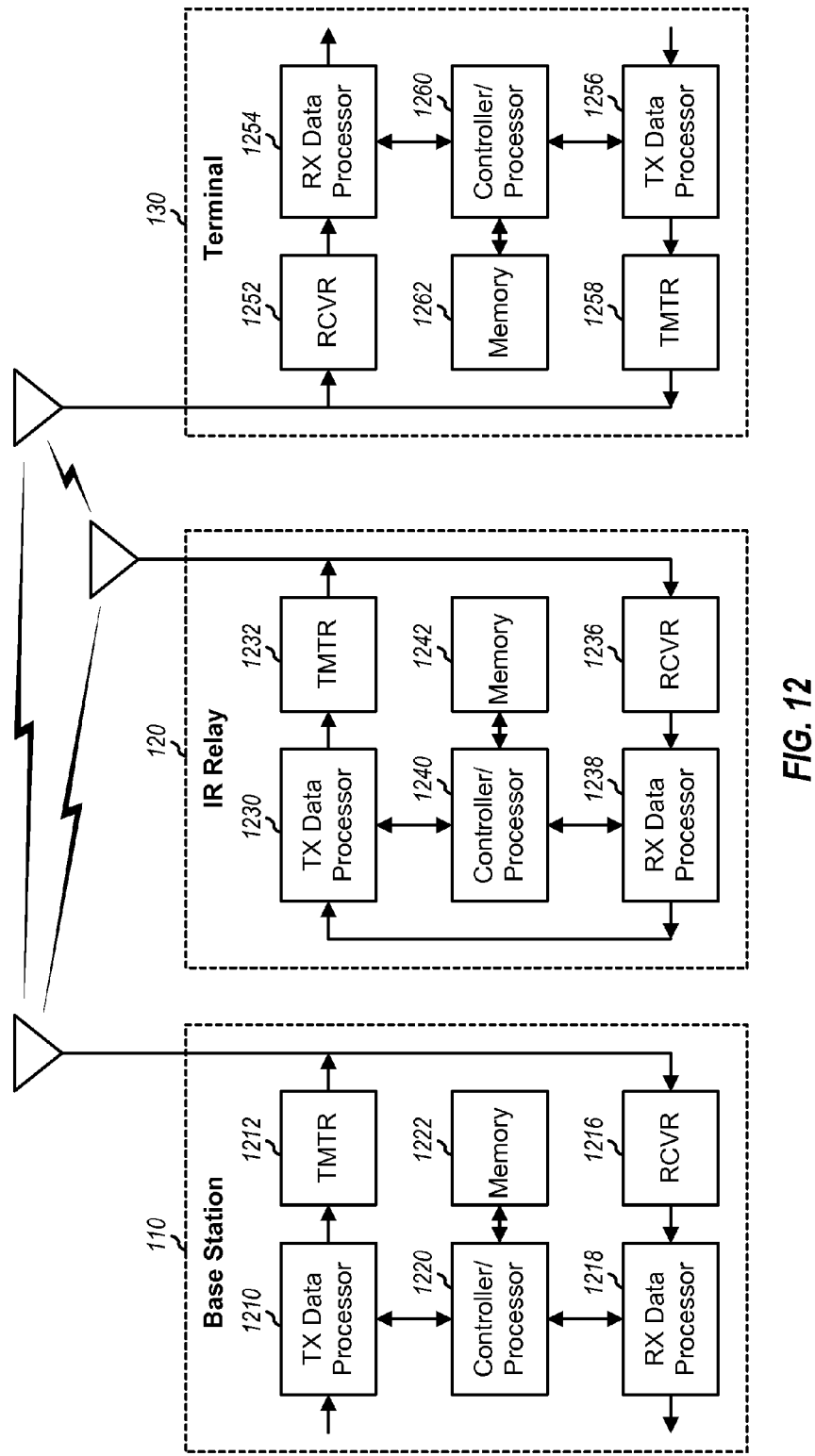
FIG. 12 shows a block diagram of a base station, a relay, and a terminal.

FIG. 12 shows a block diagram of a design of base station 110, IR relay 120, and terminal 130. Base station 110 may send transmissions to one or more terminals on the forward link and may also receive transmissions from one or more terminals on the reverse link. For clarity, processing for transmissions sent to and received from only terminal 130 is described below.

At base station 110, a transmit (TX) data processor 1210 may receive packets of data to send to terminal 130 and may process (e.g., encode and modulate) each packet in accordance with a selected packet format to obtain data symbols. Processor 1210 may generate multiple transmissions of each packet and may provide one transmission at a time. Processor 1210 may also process control information (e.g., resource assignments) to obtain control symbols and may multiplex the data symbols, the control symbols, and pilot symbols. Processor 1210 may further process the multiplexed symbols (e.g., for CDMA, OFDM, etc.) to generate output samples. A transmitter (TMTR) 1212 may condition (e.g., convert to analog, amplify, filter, and upconvert) the output samples to generate a forward link signal, which may be transmitted to IR relay 120 and terminal 130.

At IR relay 120, the forward link signal from base station 110 may be received and provided to a receiver (RCVR) 1236. Receiver 1236 may condition (e.g., filter, amplify, downconvert, and digitize) the received signal and provide input samples. A receive (RX) data processor 1238 may process the input samples (e.g., for CDMA, OFDM, etc.) to obtain received symbols. Processor 1238 may derive a channel estimate based on received pilot symbols. Processor 1238 may then perform coherent detection on received data symbols and received control symbols with the channel estimate to obtain detected symbols for terminal 130. Processor 1238 may further process (e.g., demodulate and decode) the detected symbols to recover the control information (e.g., assignments) and packets sent by base station 110 to terminal 130. A TX data processor 1230 may process (e.g., encode and modulate) each correctly decoded packet from processor 1238 in the same manner as base station 110 to obtain data symbols. Processor 1230 may multiplex the data symbols with pilot symbols and process the multiplexed symbol to obtain output samples for additional transmissions to send to terminal 130. A transmitter 1232 may condition the output samples from processor 1230 and generate a forward link relay signal, which may be transmitted to terminal 130.

At terminal 130, the forward link signal from base station 110 and the forward link relay signal from IR relay 120 may be received and conditioned by a receiver 1252, and processed by an RX data processor 1254 to recover the assignments and packets sent to terminal 130. A controller/processor 1260 may generate an ACK for each correctly decoded packet. The ACK/NAK feedback may be processed by a TX data processor 1256 and conditioned by a transmitter 1258 to generate a reverse link signal, which may be transmitted to base station 110 and IR relay 120.

At IR relay 120, the reverse link signal from terminal 130 may be received and conditioned by receiver 1236, and processed by RX data processor 1238 to recover the ACK/NAK feedback sent by terminal 130. A controller/processor 1240 may terminate transmission of each packet for which an ACK is received. If ACK/NAK feedback from IR relay 120 is supported, then controller/processor 1240 may generate an ACK for each correctly decoded packet from base station 110. The ACK/NAK feedback may be processed by TX data processor 1230 and conditioned by transmitter 1232 to generate a reverse link relay signal, which may be transmitted to base station 110.

At base station 110, the reverse link signal from terminal 130 and the reverse link relay signal from IR relay 120 may be received and conditioned by a receiver 1216, and processed by an RX data processor 1218 to recover the ACK/NAK feedback sent by terminal 130 and possibly IR relay 120. A controller/processor 1220 may terminate transmission of each data packet for which an ACK is received from IR relay 120 or terminal 130. Controller/processor 1220 may initiate transmission of a new packet when an ACK is received from terminal 130.

Controllers/processors 1220, 1240 and 1260 may direct operation at base station 110, IR relay 120, and terminal 130, respectively. Controller/processor 1240 may perform or direct process 600 in FIG. 6 and/or other processes for the techniques described herein. Controllers/processors 1220 and 1260 may each perform or direct process 800 in FIG. 8, process 1000 in FIG. 10, and/or other processes for the techniques described herein. Memories 1222, 1242 and 1262 may store data and program codes for base station 110, IR relay 120, and terminal 130, respectively.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
receiving, at a relay, at least one assignment for a packet;
determining, at the relay, assigned resources for the packet based on the at least one assignment;
receiving, at the relay, at least one transmission of the packet sent from a transmitter to a receiver, wherein the at least one transmission of the packet is received on the assigned resources;
processing, at the relay, the at least one transmission to decode the packet;
determining, at the relay, whether the packet is decoded correctly after each transmission of the packet from the transmitter, the transmitter terminating transmission of the packet in response to receiving a first acknowledgement (ACK) from the relay;
generating, at the relay, at least one additional transmission of the packet after correctly decoding the packet;
sending, at the relay, the at least one additional transmission of the packet from the relay to the receiver when the relay receives a negative acknowledgement (NAK) from the receiver wherein the at least one additional transmission of the packet is sent on the assigned resources;
detecting, at the relay, whether a second ACK or second NAK is received from the receiver after each additional transmission of the packet sent from the relay; and
sending, from the relay, another additional transmission of the packet to the receiver when the second NAK is received, wherein the at least one additional transmission and the another additional transmission of the packet comprise a hybrid automatic repeat request (HARQ) transmission comprising different redundancy information for the packet.

2. The method of claim 1, further comprising:
terminating additional transmissions of the packet if the second ACK is received.

3. The method of claim 1,
wherein the at least one assignment is sent from a base station to a terminal and intercepted by the relay or is sent from the base station to the relay, the base station being the transmitter or the receiver.

4. The method of claim 1, further comprising:
determining a packet format for the packet based on the at least one assignment, wherein the at least one transmission is processed in accordance with the packet format, and wherein the at least one additional transmission is generated in accordance with the packet format.

5. The method of claim 1, wherein the at least one additional transmission and the another additional transmission of the packet are for synchronous hybrid automatic repeat request (HARQ).

6. The method of claim 5,
wherein receiving the at least one assignment for the packet includes obtaining the assignment from a base station acting as the transmitter or the receiver, and wherein the at least one additional transmission is generated and sent in accordance with the assignment.

7. The method of claim 1, wherein the at least one additional transmission and the other additional transmission of the packet are for asynchronous hybrid automatic repeat request (HARQ).

8. The method of claim 7,
wherein receiving the at least one assignment for the packet includes obtaining the assignment for each of the at least one transmission and for each of the at least one additional transmission from a base station acting as the transmitter or the receiver, and
wherein each of the at least one transmission is received and processed in accordance with an assignment for the transmission, and
wherein each of the at least one additional transmission is generated and sent in accordance with an assignment for the additional transmission.

9. The method of claim 7,
wherein receiving the at least one assignment for the packet includes obtaining the assignment for each of the at least one transmission from a base station acting as the transmitter or the receiver, wherein each of the at least one transmission is received and processed in accordance with an assignment for the transmission, the method further comprising:
generating the assignment for each of the at least one additional transmission; and
sending the assignment for each additional transmission to the receiver, wherein each additional transmission is generated and sent in accordance with an assignment for the additional transmission.

10. The method of claim 1, further comprising:
determining a transmit power level for the relay such that received power of additional transmissions from the relay is within a predetermined range of received power of transmissions from the transmitter at the receiver, and wherein the at least one additional transmission is sent at the determined transmit power level from the relay to the receiver.

11. The method of claim 1, further comprising:
adjusting transmit timing of the relay such that additional transmissions from the relay are received within a predetermined time window of transmissions from the transmitter at the receiver, and wherein the at least one additional transmission is sent from the relay in accordance with the transmit timing of the relay.

12. The method of claim 1, further comprising:
sending no transmissions of the packet to the receiver if the packet has not been decoded correctly.

13. The method of claim 1, further comprising:
until the packet is decoded correctly
reconditioning a signal received from the transmitter, and
transmitting the reconditioned signal from the relay to the receiver.

14. The method of claim 1, further comprising:
receiving an indication of association with a terminal acting as the transmitter or the receiver; and
relaying transmissions of packets for the terminal in response to receiving the indication of association with the terminal.

15. The method of claim 1, wherein the transmitter is a base station and the receiver is a terminal, and wherein the at least one transmission is sent from the base station to the terminal on forward link.

16. The method of claim 1, wherein the transmitter is a terminal and the receiver is a base station, and wherein the at least one transmission is sent from the terminal to the base station on reverse link.

17. An apparatus for wireless communication, comprising:
at least one processor configured to:
receive, at a relay, at least one assignment for a packet,
determine, at the relay, assigned resources for the packet based on the at least one assignment,
receive, at the relay, at least one transmission of the packet sent from a transmitter to a receiver on the assigned resources,
process, at the relay, the at least one transmission to decode the packet,
determine, at the relay, whether the packet is decoded correctly after each transmission of the packet from the transmitter, the transmitter terminating transmission of the packet in response to receiving a first acknowledgement (ACK) from the relay,
generate, at a relay, at least one additional transmission of the packet after correctly decoding the packet,
send, at the relay, the at least one additional transmission of the packet from the relay to the receiver on the assigned resources when the relay receives a negative acknowledgement (NAK) from the receiver,
detect, at the relay, whether a second ACK or a second NAK is received from the receiver after each additional transmission of the packet, and
send, from the relay, another additional transmission of the packet to the receiver when the second NAK is received, wherein the at least one additional transmission and the another additional transmission of the packet comprise a hybrid automatic repeat request (HARQ) transmission comprising different redundancy information for the packet.

18. The apparatus of claim 17, wherein the at least one processor is configured to terminate additional transmissions of the packet if the second ACK is received.

19. The apparatus of claim 17, wherein the at least one assignment is sent from a base station to a terminal and intercepted by the relay or is sent from the base station to the relay, the base station being the transmitter or the receiver.

20. The apparatus of claim 17, wherein the at least one processor is configured to:
determine a packet format for the packet based on the at least one assignment,
process the at least one transmission in accordance with the packet format,
generate the at least one additional transmission in accordance with the packet format.

21. An apparatus for wireless communication, comprising:
means for receiving, at a relay, at least one assignment for a packet;
means for determining, at the relay, assigned resources for the packet based on the at least one assignment;
means for receiving, at the relay, at least one transmission of the packet sent from a transmitter to a receiver, wherein the at least one transmission of the packet is received on the assigned resources;
means for processing, by the relay, the at least one transmission to decode the packet;
means for determining, at the relay, whether the packet is decoded correctly after each transmission of the packet from the transmitter, the transmitter terminating transmission of the packet in response to receiving a first acknowledgement (ACK) from the relay;
means for generating, at the relay, at least one additional transmission of the packet after correctly decoding the packet;
means for sending, at the relay, the at least one additional transmission of the packet from the relay to the receiver when the relay receives a negative acknowledgement (NAK) from the receiver, wherein the at least one additional transmission of the packet is sent on the assigned resources;
means for detecting, at the relay, whether a second ACK or second NAK is received from the receiver after each additional transmission of the packet; and
means for sending, from the relay, another additional transmission of the packet to the receiver when the second NAK is received, wherein the at least one additional transmission and the another additional transmission of the packet comprise a hybrid automatic repeat request (HARQ) transmission comprising different redundancy information for the packet.

22. The apparatus of claim 21, further comprising:
means for terminating additional transmissions of the packet if the second ACK is received.

23. The apparatus of claim 21,
wherein the at least one assignment is sent from a base station to a terminal and intercepted by the relay or is sent from the base station to the relay, the base station being the transmitter or the receiver.

24. The apparatus of claim 21, further comprising:
means for determining a packet format for the packet based on the at least one assignment, wherein the at least one transmission is processed in accordance with the packet format, and wherein the at least one additional transmission is generated in accordance with the packet.

25. A non-transitory computer-readable medium comprising computer-executable code-for wireless communication, comprising:
code for receiving, at a relay, at least one assignment for a packet;
code for determining, at the relay, assigned resources for the packet based on the at least one assignment;
code for receiving, at the relay, at least one transmission of the packet sent from a transmitter to a receiver, wherein the at least one transmission of the packet is received on the assigned resources;
code for processing, at the relay, the at least one transmission to decode the packet:
code for determining, at the relay, whether the packet is decoded correctly after each transmission of the packet from the transmitter, the transmitter terminating transmission of the packet in response to receiving a first acknowledgement (ACK) from the relay:
code for generating, at the relay, at least one additional transmission of the packet after correctly decoding the packet:
code for sending, at the relay, the at least one additional transmission of the packet from the relay to the receiver if the relay receives a negative acknowledgement (NAK) from the receiver, wherein the at least one additional transmission of the packet is sent on the assigned resources;
code for detecting, at the relay, whether a second ACK or second NAK is received from the receiver after each additional transmission of the packet sent from the relay; and
code for sending, from the relay, another additional transmission of the packet to the receiver if the second NAK is received, wherein the at least one additional transmission and the another additional transmission of the packet comprise a hybrid automatic repeat request (HARQ) transmission comprising different redundancy information for the packet.

\* \* \* \* \*